United States Patent
Littler et al.

(10) Patent No.: US 11,100,245 B1
(45) Date of Patent: Aug. 24, 2021

(54) SYSTEMS AND METHODS OF ROLE-BASED DYNAMIC CROSS DOMAIN SOLUTIONS

(71) Applicant: Rockwell Collins, Inc., Cedar Rapids, IA (US)

(72) Inventors: Ryan P. Littler, Cedar Rapids, IA (US); Joseph M. Dusio, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 32 days.

(21) Appl. No.: 16/130,674

(22) Filed: Sep. 13, 2018

(51) Int. Cl.
  *G06F 21/62* (2013.01)
  *G06F 21/60* (2013.01)
  *G06F 30/20* (2020.01)

(52) U.S. Cl.
  CPC ........ *G06F 21/6227* (2013.01); *G06F 21/604* (2013.01); *G06F 30/20* (2020.01)

(58) Field of Classification Search
  USPC .......................................................... 726/26
  See application file for complete search history.

(56) References Cited

U.S. PATENT DOCUMENTS

| | | | |
|---|---|---|---|
| 8,613,103 B2 * | 12/2013 | Holtzman ........... | G06F 12/1483 726/17 |
| 2015/0163206 A1 * | 6/2015 | McCarthy ............... | G06F 21/10 713/171 |
| 2016/0328522 A1 * | 11/2016 | Howley .................. | G16H 10/60 |
| 2017/0346830 A1 * | 11/2017 | Goldfarb ............... | G06F 21/604 |

OTHER PUBLICATIONS

Nepal et al., "Anitya: An Ephemeral Data Management Service and Secure Data Access Protocols for Dynamic Collaborations", Dec. 2007, IEEE, pp. 219-226 (Year: 2007).*
Fairweather et al., "Towards Multi-policy Support for IaaS Clouds to Secure Data Sharing", Oct. 2013, IEEE, pp. 31-39 (Year: 2013).*
Roberta Allsman, "Simplifying the Web User's Interface to Massive Data Sets", 2013 Proceedings of the First Eighteenth IEEE Symposium on Mass Storage Systems and Technologies (MSS'01) ISBN 0-7695-0849-9/01, pp. 175-190. (Year: 2013).*

* cited by examiner

*Primary Examiner* — Khalil Naghdali
(74) *Attorney, Agent, or Firm* — Suiter Swantz pc llo

(57) ABSTRACT

A system includes a secure storage database maintaining a plurality of secure data, a storage access interface, and an access controller. The storage access interface receives a first request to retrieve a first secure data from the secure storage domain. The access controller receives the first request; determines, using a first access module, if the first request satisfies a first access condition based on the first secure data requested to be retrieved; extracts, from the first request, an indication of a role of a user associated with the first request; initializes, responsive to receiving the first request, a second access module; determines, using the second access module, if the first request satisfies a second access condition based on the indication of the role of the user; and outputs the first secure data responsive to the first request satisfying the first access condition and the second access condition.

20 Claims, 3 Drawing Sheets

SYSTEMS AND METHODS OF ROLE-BASED DYNAMIC CROSS DOMAIN SOLUTIONS

BACKGROUND

The inventive concepts disclosed herein relate generally to the field of secure data access control systems. More particularly, embodiments of the inventive concepts disclosed herein relate to systems and methods of role-based dynamic cross domain solutions.

Cross Domain Solutions can be used to control data transfer and access of information between two or more security domains. For example, access control systems can receive requests for data and output the requested data to the requesting device. However, it can be difficult to effectively control how data flows are managed under dynamic circumstances often requiring privileged administrators to change data flow rules.

SUMMARY

In one aspect, the inventive concepts disclosed herein are directed to a system. The system includes a secure storage database maintaining a plurality of secure data, a storage access interface, and an access controller. The storage access interface is configured to receive a first request to retrieve a first secure data of the plurality of secure data from the secure storage domain. The access controller is configured to initialize, responsive to activation of the access controller, a first access module; receive, via the storage access interface, the first request to retrieve a first secure data from the secure storage domain; determine, using the first access module, if the first request satisfies a first access condition based on the first secure data requested to be retrieved by the first request; extract, from the first request, an indication of a role of a user associated with the first request; initialize, responsive to receiving the first request, a second access module; determine, using the second access module, if the first request satisfies a second access condition based on the indication of the role of the user; and output, from the secure storage database to the storage access interface, the first secure data responsive to the first request satisfying the first access condition and the first request satisfying the second access condition.

In a further aspect, the inventive concepts disclosed herein are directed to a method. The method includes maintaining, by a secure storage database, a plurality of secure data; receiving, at a storage access interface, a first request to retrieve a first secure data of the plurality of secure data from the secure storage domain; activating an access controller; initializing, by the access controller responsive to activation of the access controller, a first access module; determining, using the first access module, if the first request satisfies a first access condition based on the first secure data requested to be retrieved by the first request; extracting, from the first request, an indication of a role of a user associated with the first request; initializing, responsive to receiving the first request, a second access module; determining, using the second access module, if the first request satisfies a second access condition based on the indication of the role of the user; and outputting, from the secure storage database to the storage access interface, the first secure data responsive to the first request satisfying the first access condition and the first request satisfying the second access condition.

In a further aspect, the inventive concepts disclosed herein are directed to an access controller. The access controller includes one or more processors and a non-transitory computer-readable medium comprising executable instructions that when executed by the one or more processors, cause the one or more processors to maintain a plurality of secure data; receive a first request to retrieve a first secure data of the plurality of secure data from the secure storage domain; activate an access controller; initialize, responsive to activation of the access controller, a first access module; determine, using the first access module, if the first request satisfies a first access condition based on the first secure data requested to be retrieved by the first request; extract, from the first request, an indication of a rule of a user associated with the first request; initialize, responsive to receiving the first request, a second access module; determine, using the second access module, if the first request satisfies a second access condition based on the indication of the role of the user; and output the first secure data responsive to the first request satisfying the first access condition and the first request satisfying the second access condition.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
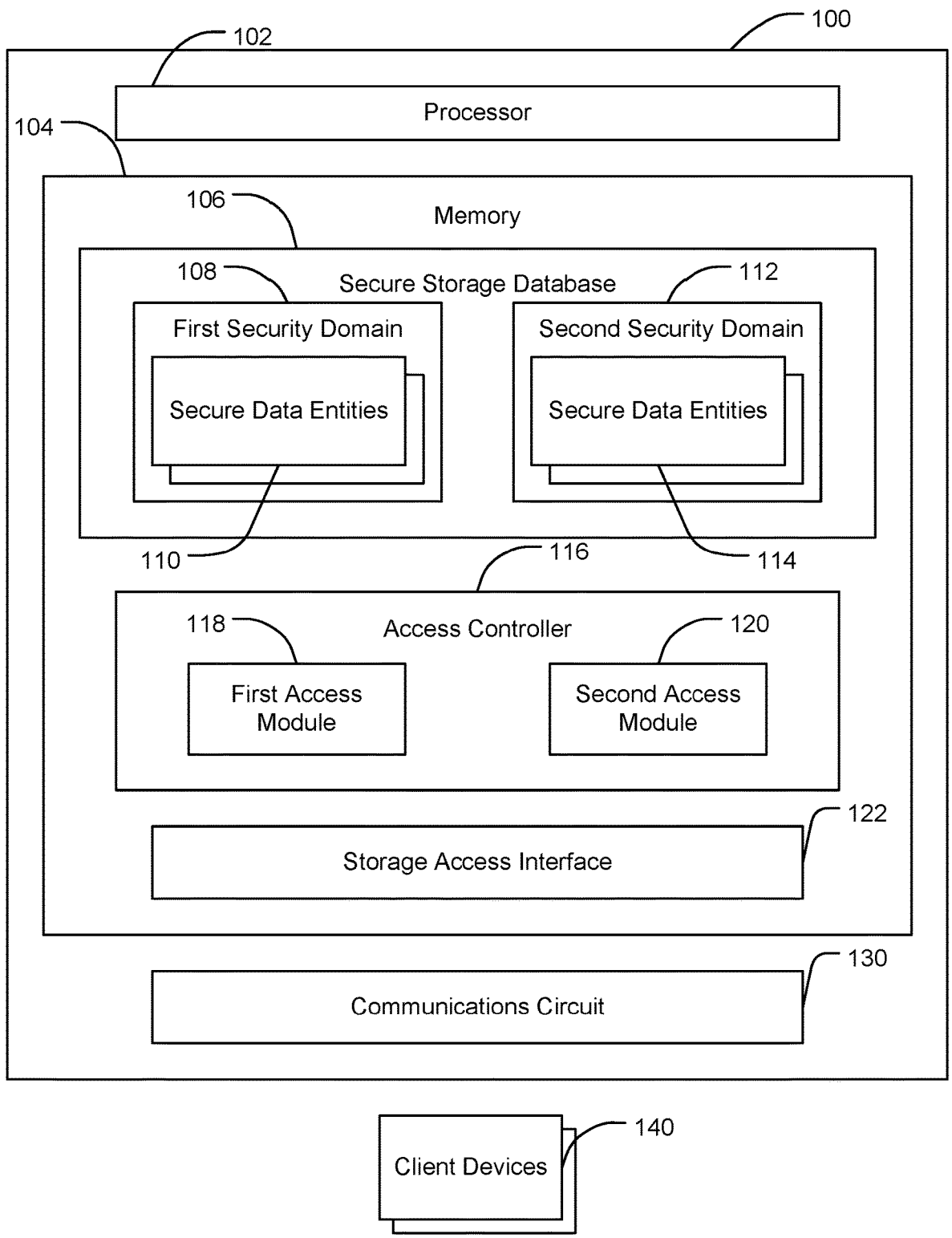
FIG. 1 is a block diagram of an exemplary of an embodiment of a system . . . according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods of role-based dynamic cross domain solutions. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a system includes a secure storage database maintaining a plurality of secure data, a storage access interface, and an access controller. The storage access interface is configured to receive a first request to retrieve a first secure data of the plurality of secure data from the secure storage domain. The access controller is configured to initialize, responsive to activation of the access controller, a first access module; receive, via the storage access interface, the first request to retrieve a first secure data from the secure storage domain; determine, using the first access module, if the first request satisfies a first access condition based on the first secure data requested to be retrieved by the first request; extract, from the first request, an indication of a role of a user associated with the first request; initialize, responsive to receiving the first request, a second access module; determine, using the second access module, if the first request satisfies a second access condition based on the indication of the role of the user; and output, from the secure storage database to the storage access interface, the first secure data responsive to the first request satisfying the first access condition and the first request satisfying the second access condition.

The system can be integrated with an airborne platform or other platform as described herein. For example, the avionics system can be an avionics system of the airborne platform, and the display system can be an aircraft cockpit display of the airborne platform.

Systems manufactured in accordance with the inventive concepts disclosed herein can improve existing data access control systems by enabling more flexible and specific management of data flows, including role-, time-, duration-, and frequency-based data management. In particular, the present solution can obviate the need for a secure storage database to rely on electronic authorization received from a privileged administrator to enable the flexible and specific management of data flows. The present solution can achieve layered security assurance by coupling role based dynamic cross domain solutions with systems implementing mandatory access control and discretionary access control methods.

Referring to FIG. 1, an exemplary embodiment of a system 100 according to the inventive concepts disclosed herein includes a processor 102, memory 104, and a communications circuit 130. The system 100 can execute role based dynamic cross domain solutions to improve the security of data flows to and from the system 100. The processor 102 may be implemented as a specific purpose processor, an application specific integrated circuit (ASIC), one or more field programmable gate arrays (FPGAs), a group of processing components, or other suitable electronic processing components. The memory 104 is one or more devices (e.g., RAM, ROM, flash memory, hard disk storage) for storing data and computer code for completing and facilitating the various user or client processes, layers, and modules described in the present disclosure. The memory 104 may be or include volatile memory or non-volatile memory and may include database components, object code components, script components, or any other type of information structure for supporting the various activities and information structures of the inventive concepts disclosed herein. The memory 104 is communicably connected to the processor 102 and includes computer code or instruction modules for executing one or more processes described herein. The memory 104 includes various circuits, software engines, and/or modules that cause the processor 102 to execute the systems and methods described herein.

The communications circuit 130 can communicate electronic data with entities remote from the system 100, such as client devices 140 (or instances of secure storage domains 108, 112 remote from depicted secure storage database 106 and networked to system 100 via a communication network). The communications circuit 130 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network). For example, the communications circuit 130 can include a USB port or an Ethernet card and port for sending and receiving data via an Ethernet-based communications link or network. The communications circuit 130 can include a Wi-Fi transceiver for communicating via a wireless communications network or cellular or mobile phone communications transceivers. The communications circuit 130 can perform datalink communications.

Memory 104 includes a secure storage database 106, an access controller 116, and a storage access interface 122. The secure storage database 106 maintains a plurality of secure data, including secure data entities 110, 114, such as to implement a dataroom of data from different secure storage domains. The secure data entities 110, 114 may include electronic data files, such as audit logs and mission data files. The secure storage database 106 can maintain a plurality of domains. For example, as shown in FIG. 1, the secure storage database 106 maintains a first security domain 108 including secure data entities 110, and a second security domain 112 including secure data entities 114. The first security domain 108 and second security domain 112 may include respective identifiers indicating each domain to be a different room in a dataroom implemented by the system 100.

The storage access interface 122 can receive, via the communications circuit 130 and from the client device(s) 140, requests to retrieve secure data, such as secure data entities 110, 114, from the secure storage database 106. In some embodiments, the request can include an indication of a particular secure data entity requested to be retrieved from the secure storage database 106. In some embodiments, the request can include an indication of a particular domain of the secure storage database 106, such as first domain 108 or second domain 112, requested to be accessed in order to retrieve secure data from the domain(s).

The request can include an indication of a role of a user associated with the request. For example, a plurality of users having varying roles may attempt to access secure data of the secure storage database 106. The system 100 may allow various levels of access depending of the role of the user.

The access controller 116 can selectively permit secure data entities 110, 114 to be outputted from the secure storage database 106 to the client device 140 in response to receiving the request. The access controller 116 includes a first access module 118 and a second access module 120. The first access module 118 includes one or more first access conditions that, when satisfied, can enable secure data to be outputted from the secure storage database 106.

In some embodiments, the access controller 116 initializes the first access module 118 responsive to activation of the access controller 116. For example, when system 100 is initialized (e.g., receives power; begins operation of an operating system), access controller 116 can be activated and, responsive to being activated, initialize the first access module 116. In some embodiments, the first access module 118 executes mandatory access control.

The second access module 120 includes one or more second access conditions that, when satisfied, can enable secure data to be outputted from the secure storage database 106. In some embodiments, the second access module 120 includes a second access condition associated with the role of the user. For example, the second access condition can map each role to one or more privileges for accessing secure data of the secure storage database 106. In some embodiments, the second access condition can map the particular role to privileges to access individual secure data (e.g., individual secure data entities 110, 114), to access a grouping of secure data (e.g., first domain 108, second domain 112), and/or to access all secure data of the secure storage database 106. For example, the second access module 120 can include a second access condition indicating that a security maintainer role (which the first access module 118, on its own, may provide access to the entirety of the secure storage database 106) may have access to apply security updates to the system 100, but does not have access to retrieve certain secure data entities 110, 114, such as particular mission data in the secure storage database 106.

The access controller 116 can initialize the second access module 120 responsive to the system 100 receiving the request. For example, the access controller 116 can initialize the second access module 120 when the access controller 116 validates user credentials (e.g., login information) received with the request. If the access controller 116 determines the user credentials to not be valid, the access controller 116 cannot initialize the second access module 120.

The access controller 116 can use the first access module 118 to determine if the request satisfies the first access condition based on the secure data requested to be retrieved by the first request. For example, when activated, the first access module 118 can allow data flows for secure data that matches the requested secure data. As such, the access controller 116 can retrieve an identifier of a first secure data to be retrieved from the secure storage database 106, and determine the request to satisfy the first access condition based on the identifier match a corresponding first secure data entity stored in the secure storage database 106.

The access controller 116 can use the second access module 120 to determine if the request satisfies the second access condition based on the indication of the role of the user that the access controller 116 extracted from the request. For example, if the second access condition maps the role of the user to secure data access privileges, the access controller 116 can retrieve, based on the indication of the role of the user, an access privilege, compare the retrieved access privilege to a data access privilege assigned to the secure data requested to be retrieved, and determine the second access condition to be satisfied based on the retrieved access privilege matching the data access privilege assigned to the secure data requested to be retrieved.

In some embodiments, the access controller 116 determines if the request satisfies the second access condition being a time-based condition. The second access module 120 can define the time-based condition to indicate one or more durations of time at which the secure storage database 106, or portions thereof (e.g., domains 108, 112; specific secure data entities 110, 114) can be accessed. For example, the second access module 120 can define the time-based condition to indicate that the first secure domain 108 can be accessed during specific periods of time during the day. The second access module 120 can map the one or more durations of time to roles of users; for example, certain roles may have access during first time(s), while different roles may have access during second time(s) different than the first time(s). The access controller 116 can retrieve a current time (e.g., using a system clock of the system 100), compare the current time to the time defined by the second access condition, and determine the second access condition to be satisfied based on the comparison.

In some embodiments, the access controller 116 determines if the request satisfies the second access condition being a frequency-based condition. The second access module 120 can define the frequency-based condition to indicate a threshold frequency of access that cannot be exceeded. The threshold frequency can include a number of times of access of the secure storage database 106, or a portion thereof (e.g., domains 108, 112; specific secure data entities 110, 114).

The threshold frequency can correspond to a period of time; for example, the access controller 116 can initialize a timer and a counter responsive to a first time access is requested (or provided) for particular secure data, increment the counter each time access is requested (or provided) for the particular secure data, and reduce the counter responsive to the timer exceeding a time threshold. For example, if the threshold frequency is ten accesses per hour, the access controller 116 can initialize the counter responsive to the first access request, and reduce the counter responsive to an hour expiring to account for access requests older than one hour. In some embodiments, the threshold frequency corresponds to the role of the user. For example, a relatively high threshold frequency may correspond to a typical user role, whereas a relatively low threshold frequency may correspond to a maintenance role intended to only be able to access the secure storage database 106 a limited number of times.

The access controller 116 can output the secure data requested by the request from the secure storage database 106 responsive to the request satisfying the first access condition and the second access condition. If at least one of the first access condition or the second access condition is not satisfied, the access controller 166 can not output the secure data, such as by indicating an error condition or otherwise denying the request. As such, the access controller 116 can ensure that data flows meet both data-specific access requirements and role-specific access requirements, even if those requirements depend on dynamic factors.

As shown in FIG. 1, the first security domain 108 stores secure data entities 110, which can include a first secure data entity 110 and a second entity 110, and the second security domain 112 stores secure data entities 114, which can include a third data entity 114 and a fourth data entity 114. In some embodiments, the first access module 118 allows access to the first security domain 108 and the second security domain 112, and thus to each of the first secure data entity 110, the second secure data entity 110, the third secure data entity 114, and the fourth secure data entity 114. The second access module 120 can selectively allow access to at least one of the first secure data entity 110 and the third secure data entity 112 based on the indication of the role of the user. For example, if the first security domain 108 includes audit logs and the second security domain 110 includes mission data, the second access module 120 can allow access to the first security domain 108 and not allow access to the second security domain 110 if the role of the user indicates the user is a secure maintainer that should access the audit logs and not the mission data.

Figure 2:
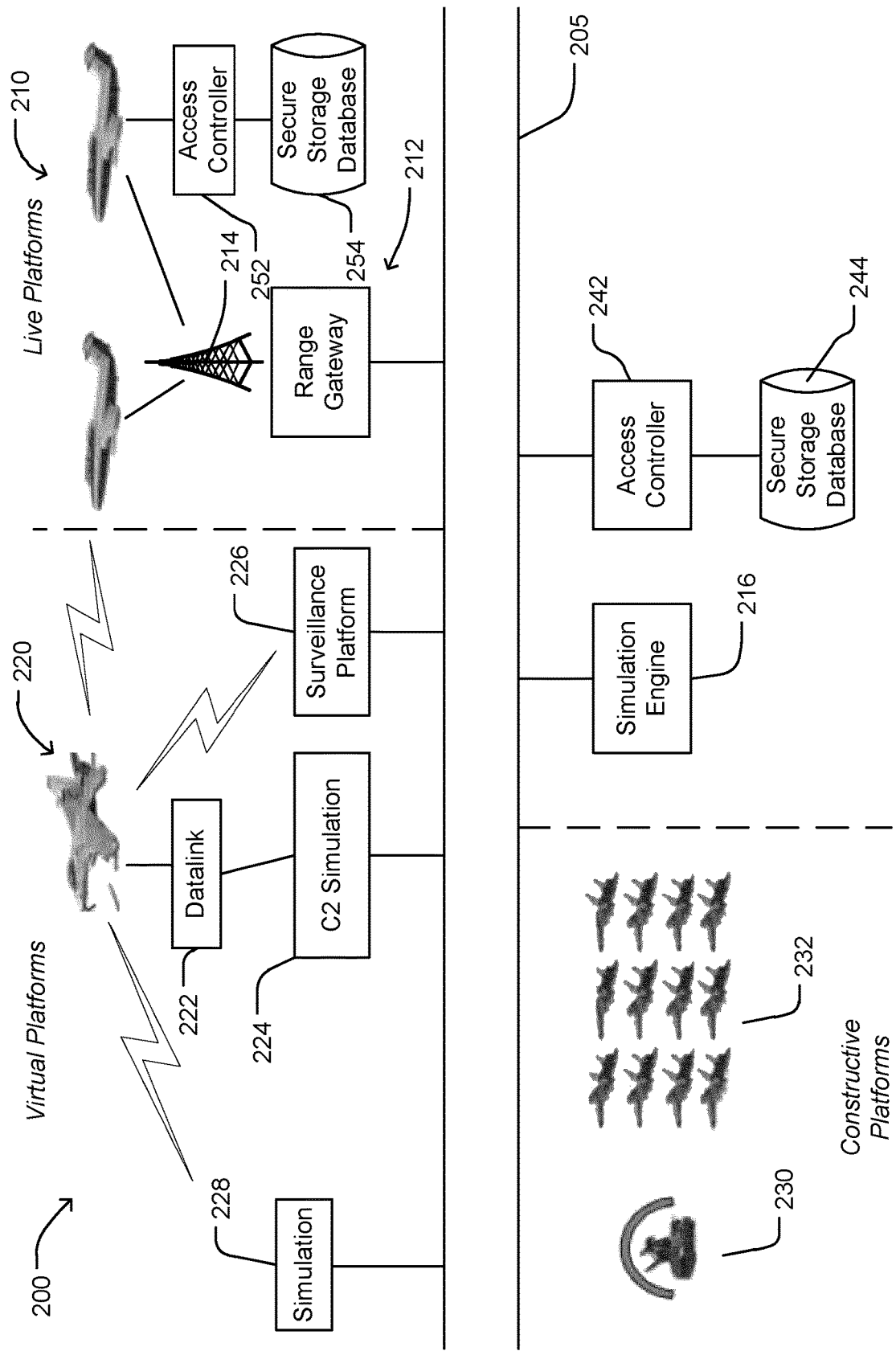
FIG. 2 is a schematic diagram of an exemplary embodiment of a LVC environment according to the inventive concepts disclosed herein.

Referring now to FIG. 2, a schematic diagram of a system 200 of an live, virtual, constructive (LVC) environment is shown according to an exemplary embodiment of the inventive concepts disclosed herein. The system 200 can include a network 205 configured to facilitate communication between live platforms 210, virtual platforms 220, 224, 226, and 228, and constructive platforms 230, 232. The various platforms illustrated with reference to FIG. 2 are examples of platforms in each category (live, virtual, constructive), but the system 200 can be configured to facilitate communication between any other platforms.

The live platforms 210 can be piloted vehicles (e.g., piloted airborne platforms, piloted aircraft, trainer aircraft), remotely controlled vehicles (e.g., remotely controlled automobiles or drones, unmanned aircraft), or autonomous vehicles (e.g., unmanned autonomous vehicles). The live platforms 210 can be configured to communicate with the network 205 via a real or simulated or emulated range gateway 212, which may include or be operatively coupled to a communications device 214 (e.g., a radio tower). The range gateway 212 can be configured to transmit range data to the live platforms 210. The range gateway 212 can include a range network emulation engine configured to generate range data associated with virtual or constructive platforms based on data received from the virtual or constructive platforms. The range gateway 212 can include one or more range monitors configured to detect range data regarding the live platforms 210.

The virtual platforms can be simulated platforms, such as tactical cockpit simulators, simulated airborne platform 220, a command and control (C2) simulation 224, a surveillance platform simulation 226, or other simulated platforms 228, such as ground vehicle simulations. As compared to the live platforms 210, a greater proportion (e.g., some or all) of the sensory data received by the virtual platforms may be simulated rather than received from physical or live sensors, and control instructions received from an autopilot or user control interface by the virtual platforms may be used to generate simulated responses rather than physical movement or other physical responses. The virtual platforms can include or be communicatively coupled to a virtual datalink 222, which may simulate or emulate electronic communications (e.g., wireless communications) between multiple virtual platforms, or may simulate a communication interface by which the virtual platforms communicate with the network 205 and the live or constructive platforms. The virtual platforms (e.g., airborne platform 220) may also include communications devices configured to directly receive signals from and transmit signal to the live platforms 210.

The constructive platforms can be computer-generated platforms, such as ground-based platforms 230 (e.g., surface-to-air threats) or airborne platforms 232 (e.g., air-to-air threats). For example, the simulation engine 216 can execute a platform model associated with characteristics of the constructive platforms such as movement ability and communications ability. As compared to the virtual platforms, the constructive platforms may be fully software-based throughout the development cycle of the systems being simulated or tested, and/or may not be configured to be controlled by a user or by an autopilot as complex as an autopilot of the virtual platforms.

The system 200 uses an access controller 242 to manage access to secure data of secure storage database 244. The access controller 242 can incorporate features of the access control system 100 of FIG. 1, including access controller 116 (e.g., including first access module 118 and second access module 120). The secure storage database 244 can incorporate features of the secure storage database 106 of FIG. 1. The secure storage database 244 can be implemented as secure data remote from and/or maintained by the various platforms of the simulator 200, such as live platforms 210, virtual platforms 220, 224, 226, 228, and constructive platforms 230, 232. For example, each platform can be associated with a simulated representation that includes a data security domain implemented in secure storage database 244. In some embodiments, the platforms can include an access controller managing access to a secure storage database, such as shown with respect to the access controller 252 and secure storage database 254 of live platform 210.

The access controller 242 can manage access to the secure storage database 244 based on requests received from the various platforms (e.g., from simulated representations thereof). The access controller 242 is coupled to network 205, and the secure storage database 244 can be accessed by entities on the network 205 via the access controller 242. The access controller 242 can provide secure data from the secure storage database 244 to the requesting platform using an identifier of the simulated representation, the first access module, and the second access module. For example, the access controller 242 can use the first access module to enable access to the secure storage database 244 upon activation, and use the second access module to enable access specific to the identifier of the simulated representation. The access controller 242 can evaluate access based on the identifier of the simulated representation in a similar manner as the role of the user described with respect to FIG. 1. In some embodiments, the secure storage database 244 maintains instrumentation data regarding a particular platform (e.g., live platform 210), the access controller 242 receives a request to retrieve the instrumentation data from a remote platform (e.g., virtual platform 220), and determines whether to provide the instrumentation data regarding the live platform 210 to the virtual platform 220 based on the identifier of the virtual platform 220.

Figure 3:
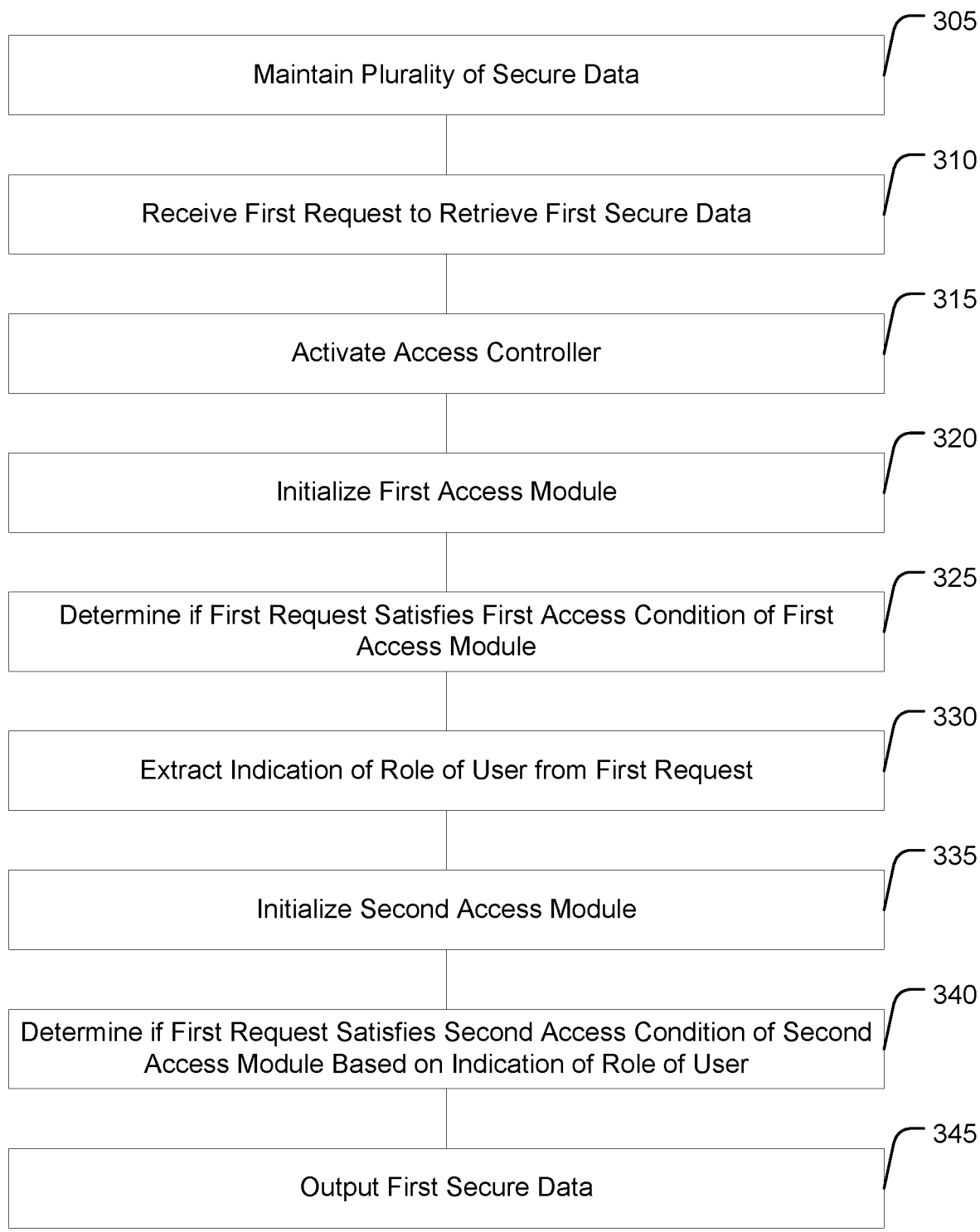
FIG. 3 is a flow diagram of a method of executing a role-based dynamic cross domain solution according to the inventive concepts disclosed herein.

Referring now to FIG. 3, an exemplary embodiment of a method 300 of implementing role based dynamic cross domain solutions is shown according to the inventive concepts disclosed herein. The method 300 can be implemented using the system 100 and/or the system 200.

A step (305) may include maintaining, by a secure storage database, a plurality of secure data. The secure storage database can include a plurality of secure data entities. The secure storage database can include a first security domain including one or more first data entities, and a second security domain including one or more second data entities. The secure storage database can maintain data regarding instrumentation of an airborne platform. The secure storage database can maintain mission data. The secure storage database can maintain audit logs.

A step (310) may include receiving, at a storage access interface, a first request to retrieve a first secure data of the plurality of secure data from the secure storage database, which may be extended to remote secure storage. The first request can be received from a client device remote from the secure storage database. The first request can include an indication of a role of a user associated with the request.

A step (315) may include activating an access controller. For example, when a system implementing the access controller is initialized (e.g., receives power; begins operation of an operating system), the access controller can be activated.

A step (320) may include initializing, by the access controller responsive to activation of the access controller, a first access module. The first access module can be used to execute mandatory access control.

A step (325) may include determining, using the first access module, if the first request satisfies a first access condition based on the first secure data requested to be retrieved by the first request. The first access condition may be satisfied if the first access module is initialized.

A step (330) may include extracting, from the first request, the indication of a role of a user associated with the first request. A step (335) may include initializing, responsive to receiving the first request, a second access module. For example, the access controller can initialize the second access module when the access controller validates user credentials (e.g., login information) received with the request. The second access module can be used to execute discretionary access control.

A step (340) may include determining, using the second access module, if the first request satisfies a second access condition based on the indication of the role of the user. The second access module can include at least one second access condition. The at least one second access condition can be used to determine whether to enable access based on the indication of the role of the user. The second access condition can map each role to one or more privileges for accessing secure data of the secure storage database.

The at least one second access condition can include a time-based condition. The access controller can determine if the first request satisfies the second access condition based on a time associated with the first request, such as a time of receipt of the first request.

The at least one second access condition can include a frequency-based condition. The access controller can determine if the second request satisfies the second access condition based on a frequency associated with the first request, such as a number of times of receipt during a predetermined period of time of requests associated with the user (or role of the user) indicated by the first request.

A step (345) may include outputting, from the secure storage database to the storage access interface, the first secure data responsive to the first request satisfying the first access condition and the first request satisfying the second access condition. If the first request is not determined to satisfy both the first access condition and the second access condition, then the first secure data is not outputted, such as by outputting an error condition. In some embodiments, the access controller receives the request from a simulated representation of a platform, and uses an identifier of the simulated representation as the indication of the role of the user to determine whether to provide the requested secure data to the simulated representation.

As will be appreciated from the above, systems and methods for role based dynamic cross domain solutions in accordance with the inventive concepts disclosed herein can improve upon existing data access control systems by enabling more flexible and specific management of data flows. For example, such systems and methods can enable role-based rule activation, as well as time, duration, and frequency based data management. Layered security assurance is achieved by coupling role based dynamic cross domain solutions with systems implementing mandatory access control and discretionary access control methods. The present solution can improve upon existing systems by obviating the need for electronic authorization for flexible data flows from a privileged administrator.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a secure storage database maintaining a plurality of secure data;
a storage access interface configured to receive a first request to retrieve a first secure data of the plurality of secure data from a secure storage domain; and
an access controller configured to:
initialize, responsive to activation of the access controller, a first access module;
receive, via the storage access interface, the first request to retrieve a first secure data from the secure storage domain;
determine, using the first access module, if the first request satisfies a first access condition based on the first secure data requested to be retrieved by the first request;
extract, from the first request, an indication of a role of a user associated with the first request;
initialize, responsive to receiving the first request, a second access module;
determine, using the second access module, if the first request satisfies a second access condition based on the indication of the role of the user; and
output, from the secure storage database to the storage access interface, the first secure data responsive to the first request satisfying the first access condition and the first request satisfying the second access condition.

2. The system of claim 1, wherein the secure storage database maintains a first security domain including a first data object of the plurality of secure data and a second security domain including a second data object and a third data object of the plurality of secure data, the first access module allows access to the first data object and the second data object, and the second access module selectively allows access to at least one of the first data object or the second data object based on the indication of the role of the user.

3. The system of claim 1, wherein the second access condition includes a time-based condition, and the access controller determines if the first request satisfies the second access condition based on a time associated with the first access request.

4. The system of claim 1, wherein the second access condition includes a frequency-based condition, and the access controller determines if the first request satisfies the second access condition based on a frequency of access attempts associated with the first access request.

5. The system of claim 1, wherein the first access module executes mandatory access control.

6. The system of claim 1, wherein the second access module executes discretionary access control.

7. The system of claim 1, wherein the system includes a simulator configured to simulate a plurality of simulated representations of an environment associated with a corresponding plurality of platforms, each simulated representation including a data domain corresponding to one or more secure data of secure storage database, and the access controller is configured to provide the one or more secure data to each respective simulated representation using an identifier of the simulated representation, the first access module, and the second access module.

8. The system of claim 7, wherein the secure storage database maintains data regarding instrumentation of an airborne platform.

9. A method, comprising:
maintaining, by a secure storage database, a plurality of secure data;
receiving, at a storage access interface, a first request to retrieve a first secure data of the plurality of secure data from the secure storage domain;
activating an access controller;
initializing, by the access controller responsive to activation of the access controller, a first access module;
determining, using the first access module, if the first request satisfies a first access condition based on the first secure data requested to be retrieved by the first request;
extracting, from the first request, an indication of a role of a user associated with the first request;
initializing, responsive to receiving the first request, a second access module;
determining, using the second access module, if the first request satisfies a second access condition based on the indication of the role of the user; and
outputting, from the secure storage database to the storage access interface, the first secure data responsive to the first request satisfying the first access condition and the first request satisfying the second access condition.

10. The method of claim 9, comprising:
maintaining, by the secure storage database, a first security domain including a first data entity and a second security domain including a second data entity and a third data entity;
allowing access by the first access module to the first data entity and the second data entity; and
selectively allowing access by the second access module to at least one of the first data entity or the second data entity based on the indication of the role of the user.

11. The method of claim 9, wherein the second access condition includes a time-based condition, the method comprising determining, by the access controller, if the first request satisfies the second access condition based on a time associated with the first access request.

12. The method of claim 9, wherein the second access condition includes a frequency-based condition, the method comprising determining, by the access controller, if the first request satisfies the second access condition based on a frequency of access attempts associated with the first access request.

13. The method of claim 9, comprising executing mandatory access control using the first access module.

14. The method of claim 9, comprising executing discretionary access control by the second access module.

15. The method of claim 9, comprising:
simulating, by a simulator, a plurality of simulated representations of an environment associated with a corresponding plurality of platforms, each simulated representation including a data domain corresponding to one or more secure data of secure storage database; and
providing, by the access controller, the one or more secure data to each respective simulated representation using an identifier of the simulated representation, the first access module, and the second access module.

16. The method of claim 9, wherein providing the one or more secure data includes providing instrumentation data of an airborne platform.

17. An access controller, comprising:
one or more processors; and
a non-transitory computer-readable medium comprising executable instructions that when executed by the one or more processors, cause the one or more processors to:

maintain a plurality of secure data;
receive a first request to retrieve a first secure data of the plurality of secure data from the secure storage domain;
activate an access controller;
initialize, responsive to activation of the access controller, a first access module;
determine, using the first access module, if the first request satisfies a first access condition based on the first secure data requested to be retrieved by the first request;
extract, from the first request, an indication of a rule of a user associated with the first request;
initialize, responsive to receiving the first request, a second access module;
determine, using the second access module, if the first request satisfies a second access condition based on the indication of the role of the user; and
output the first secure data responsive to the first request satisfying the first access condition and the first request satisfying the second access condition.

18. The access controller of claim 17, comprising instructions that cause the one or more processors to determine if the first request satisfies the second access condition based on at least one of a time or a frequency of access attempts associated with the first access request.

19. The access controller of claim 17, comprising instructions that cause the one or more processors to:
maintain a first domain including a first data entity of the plurality of secure data and a second domain including a second data entity and a third data entity of the plurality of secure data;
allow access to the first data entity and the second data entity using the first access module; and
selectively allows access to at least one of the first data entity or the second data entity using the second access module based on the indication of the role of the user.

20. The access controller of claim 17, wherein the plurality of secure data includes data received from an instrument of an airborne platform.

\* \* \* \* \*